(12) United States Patent
Washizawa

(10) Patent No.: US 6,338,060 B1
(45) Date of Patent: Jan. 8, 2002

(54) DATA PROCESSING APPARATUS AND METHOD FOR OUTPUTTING DATA ON THE BASIS OF SIMILARITY

(75) Inventor: Teruyoshi Washizawa, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/236,583

(22) Filed: Jan. 26, 1999

(30) Foreign Application Priority Data

Jan. 30, 1998 (JP) .......................................... 10-018935

(51) Int. Cl.[7] .............................................. G06F 17/30
(52) U.S. Cl. .................................... 707/5; 3/6
(58) Field of Search .......................... 395/794; 707/3, 707/5, 6

(56) References Cited

U.S. PATENT DOCUMENTS 5,619,709 A * 4/1997 Caid et al. .................. 395/794
5,864,846 A * 1/1999 Voorhees et al. ............... 707/5
5,926,812 A * 7/1999 Hilsenrath et al. ............. 707/5
5,950,189 A * 9/1999 Cohen et al. ................... 707/3

* cited by examiner

*Primary Examiner*—Kim Vu
*Assistant Examiner*—Cam Y Truong
(74) *Attorney, Agent, or Firm*—Fitzpatrick, Cella, Harper & Scinto

(57) ABSTRACT

In order to output a predetermined number of candidate data elements similar to an inquiry vector from a set of data in a vector form stored in a database, a list of data in which data of a database is arranged in a descending order of the intensity of one component of a vector is created for each component. Then, an inquiry vector, and a metric tensor that defines the inner product of the inquiry vector and the data are input. A score based on a value such that the order in the list for each of the components is subtracted from the predetermined number and the component of the inquiry vector for the components in the inner product is added for all the components with respect to each data. The predetermined number of data elements is output on the basis of the score.

13 Claims, 3 Drawing Sheets

DATA PROCESSING APPARATUS AND METHOD FOR OUTPUTTING DATA ON THE BASIS OF SIMILARITY

BACKGROUND OF THE INVENTION

1. Field of the Invention

The present invention relates to a data processing apparatus for calculating similarity among vectors and a method therefor. More particularly, the present invention relates to a data processing apparatus for outputting a predetermined number of data elements on the basis of similarity with an inquiry vector, and a method therefor.

2. Description of the Related Art

In a method for calculating similarity among vectors, distance is conventionally used. In general, a problem is often handled such that when a predetermined key vector is given, L number of vectors close to the key vector are extracted from among a predetermined set of vectors. In the setting of such problems, if comparison computations with all vectors are performed, the computational complexity reaches O (MN) with respect to the dimension M of the vectors and the number N of elements of the vectors.

Accordingly, several high-speed algorithms for distance calculations have been provided. The strategies common to these high-speed algorithms aim to convert data into a structured form in advance in order to lessen the computational complexity during distance calculations.

In a method in which, for example, a sorting list is created on the basis of a component value along each axis of a vector, when a vector serving as a key is given, the axes are sorted according to an appropriate priority, and the location of the component value of the key vector in the sorting list of the axis which is at the highest order is specified. Starting in sequence from the vector stored at a nearby position, the distance between the vector and the key vector is calculated on the basis of the ID thereof. Distances to all the vectors must be calculated to obtain accurate results. However, if the sequence for the component value of the selected axis reflects well the actual distance between the vectors, satisfactory results can be expected with a smaller number of calculations.

In this method, only a number of calculations on the order of O (N $\log_2$N) for structuring data and on the order of O (L $\log_2$N) for comparison computations with L vectors are required. In addition to this method, called a "projection method", there are methods using a k-d tree and derivative versions thereof, and the order of the computational complexity during pre-processing and retrieval is nearly the same.

Although the above-described conventional technologies are related to distance calculations of vectors, there is a case in which a norm is effective as a measure for expressing similarity among vectors. For example, in "A Metadatabase System for Semantic Image Search by a Mathematical Model of Meaning", by Kiyoki Y., Kitagawa T., and Hayama T., in SIGMOD RECORD, Col.23, No.4, December 1994 (hereinafter referred to as "Reference 1"), similarity with context vectors is calculated as described below. That is, a projection operator with respect to the representation space is generated on the basis of a context vector, and the norm of the vector in the subspace extracted by this projection operator is calculated, thereby defining the similarity with the context vector.

In "High-speed Algorithm for Semantic Image Search by a Mathematical Model of Meaning", by Miyahara, Kiyoki, and Kitagawa, in an Information Processing Society of Japan Research Report, Database System 113-41, Jul. 15, 1997 (hereinafter referred to as "Reference 2"), a high-speed algorithm for such similarity calculation has been proposed. This is a direct application of the projection method in the above-mentioned distance calculation. That is, a sorting list with respect to each axis is created in advance. Then, if a context vector is given, the priority of each axis is determined on the basis of the component value of the context vector. Based on this priority of the axis (the priority of the sorting list) and the order in each list, similarity with the context vector is determined. In this method, the number of calculations of preprocessing is on the order of O (N $\log_2$N) and the number of comparison calculations is on the order of a number L of data which is output as results.

However, the above-described conventional method of Reference 2 has the problems described below. These are described by referring to FIG. 2 which shows an example of a sorting list created by the conventional method of Reference 2.

In FIG. 2, each numeral indicates the ID number of a vector. Each row represents sorting lists for each individual axis. The nearer to the top of the list a row is, the higher the priority of the corresponding axis, and in the list, the more leftward, the higher the priority of the vector.

In the method of Reference 2, at first, the vector positioned at the highest order of the sorting list of the axis having the highest priority is determined to have the highest similarity, that is, the vector of ID number 10 in FIG. 2. Next, the vector positioned at the second place of the same axis (i.e., same row), that is, the vector of ID number 6 in FIG. 2, is assumed to have the second highest similarity. The vector having the third highest similarity is determined to be the vector positioned at the highest order of the sorting list of the axis having the second highest priority, that is, the vector of ID number 3 in the figure. As described above, in the method of Reference 2, since similarity is determined by the sequence of the position on the list, there is a possibility that, for example, the sequence of ID number 6 and ID number 3 is reversed to that of the actual similarity.

SUMMARY OF THE INVENTION

Accordingly, it is an object of the present invention to provide a data processing apparatus and method capable of creating a part of sorting lists of a vector data set based on similarity with a given vector at a high speed.

It is another object of the present invention to provide a data processing apparatus and method capable of retrieving a vector similar to an inquiry vector from a database at a high speed.

According to one aspect, the present invention which achieves these objectives relates to a data processing apparatus for extracting a predetermined number of data elements having a high similarity based on an inner product with an inquiry vector from a set of data in a vector form, the data processing apparatus comprising: a database for storing a set of data in a vector form; list creation means for creating a list of data such that the data of the database is arranged in a descending order of the intensity of each one component of a vector, respectively; input means for inputting an inquiry vector; score calculation means for adding with respect to each data, for all the components, a score based on a numerical value given in a descending order to the place of the list for each of the components, and the component of the inquiry vector corresponding to the component of the data with regard to the inner product; and output means for outputting the predetermined number of data elements on the basis of the score.

According to another aspect, the present invention which achieves these objectives relates to a data processing method for extracting a predetermined number of data elements having a high similarity based on an inner product with an inquiry vector from a set of data in a vector form stored in a database, the data processing method comprising: a list creation step of creating, for each component, a list of data in which data of the database is arranged in a descending order of the intensity of one component of a vector; an input step of inputting an inquiry vector; a score calculation step of calculating with respect to each data, for all components, a score based on a numerical value given in a descending order to the place of a list for each of the components, and the component of the inquiry vector corresponding to the component of the data with regard to the inner product; and an output step of outputting the predetermined number of data elements on the basis of the score.

According to still another aspect, the present invention which achieves these objectives relates to a computer-readable storage medium storing a data processing program for controlling a computer to extract a predetermined number of data elements having a high similarity based on an inner product with an inquiry vector from a set of data in a vector form stored in a database, the program comprising codes for causing the computer to perform: a list creation step of creating, for each component, a list of data in which data of the database is arranged in a descending order of the intensity of one component of a vector; an input step of inputting an inquiry vector; a score calculation step of calculating with respect to each data, for all components, a score based on the numerical value given in a descending order to the place of a list for each of the components, and the component of the inquiry vector corresponding to the component of the data with regard to the inquiry vector; and an output step of outputting the predetermined number of data elements on the basis of the score.

Other objectives and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

DESCRIPTION OF THE PREFERRED EMBODIMENT

The preferred embodiment of the present invention will now be described below in detail with reference to the accompanying drawings.

Figures 1, 2:
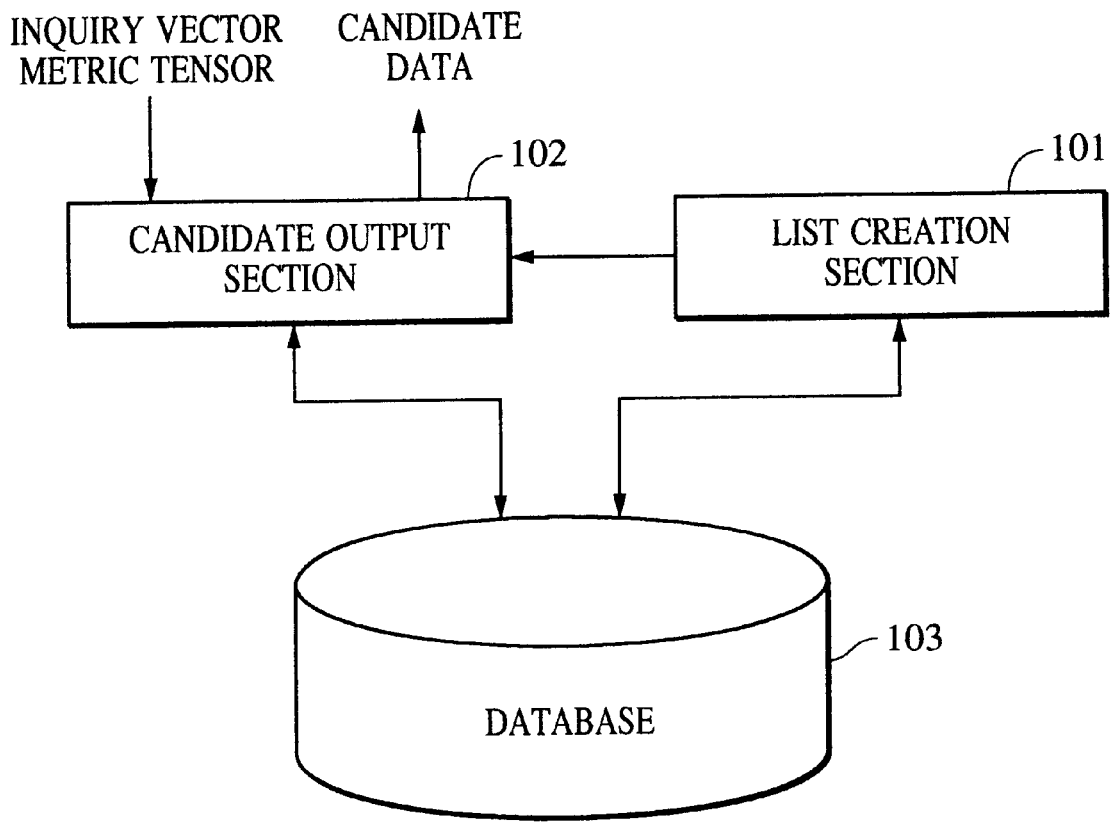
FIG. 1 is a function diagram of an information processing apparatus according to an embodiment of the present invention.
FIG. 2 shows an example of a sorting list.

FIG. 1 is a function diagram of a data processing apparatus according to an embodiment of the present invention.

The sections of the apparatus may be such that each section is a unit including a dedicated program memory and processor as long as functions to be described below are realized, or a plurality of function sections may be realized by the same CPU executing each function program (including a program corresponding to the procedure to be described later with reference to a flowchart) stored in a ROM, a disk memory, and the like, or executing a control program for controlling specific hardware corresponding to each function.

In FIG. 1, a database 103 has stored therein data for objects of retrieval described as vectors. A list creation section 101 creates and stores the list of data IDs arranged in a descending order for each component with respect to the data of the database 103. A candidate output section 102 calculates the similarity between an inquiry vector and the data of the database 103 and outputs a predetermined number of candidate data elements.

Figure 4:
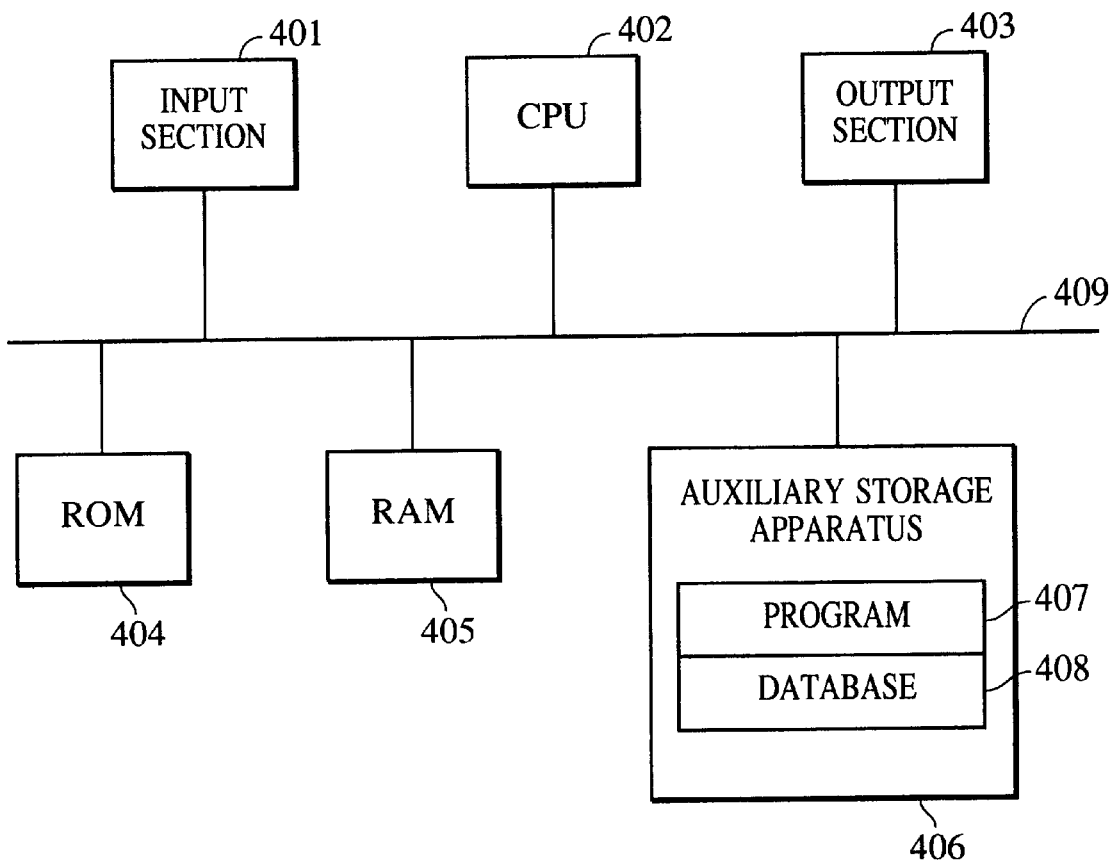
FIG. 4 shows hardware configuration of each apparatus of the embodiment of the present invention.

FIG. 4 shows an example of hardware configuration of an information processing apparatus of the embodiment of the present invention.

Referring to FIG. 4, an input section 401 comprises a keyboard and a mouse through which a user inputs a key word, a command, and the like. A CPU 402 controls the sections of the system, and executes various programs. An output section 403 displays or prints extracted data, or transmits it to an external apparatus.

A ROM 404 has stored therein fixed data and fixed programs. A RAM 405 has a data area for storing data required for processing, such as data input from the user or extracted data, and has a program area for storing a program 407 loaded from an auxiliary storage apparatus 406. The auxiliary storage apparatus 406 stores the program 407 and a database 408 for an object of retrieval by using a storage medium, such as a floppy disk or a hard disk. A bus 409 connects the above-described sections with each other.

<List Creation Section 101>

It is assumed that data for an object of processing is represented as a vector on a metric vector space having an appropriate dimension. Hereinafter, the m-th component intensity of arbitrary data X belonging to a data set is described as $X_m$. The metric $\rho$ (X,Y) of two data X and Y belonging to the metric vector space can be calculated by the following equation by using a metric tensor G:

$$\rho(X,Y) = <X|G|Y> \quad (1)$$

Writing $\rho$ in sequence by using computations for each component of the vector gives the following:

$$\rho = X_m g^{mn} Y_n \quad (2)$$

Equation (2) follows Einstein's notation of taking the sum over those whose subscripts and superscripts match each other. In equation (1) above, G is the metric tensor, which is given in a matrix form in which the component of the j-th row and the i-th column is $g^{ji}$.

Data represented by an M-dimensional vector space is stored in the database 103. In the list creation section 101, sorting lists in which this data is arranged according to the intensity of each component is created and stored. The sorting list is such that IDs of N number of data elements are arranged for each component.

<Candidate Output Section 102>

In the candidate output section 102, the higher-order L candidates are output from among the data in which the inner product with the inquiry vector K specified by the user is large, where the inner product is based on the metric tensor G given from the user.

Figure 3:
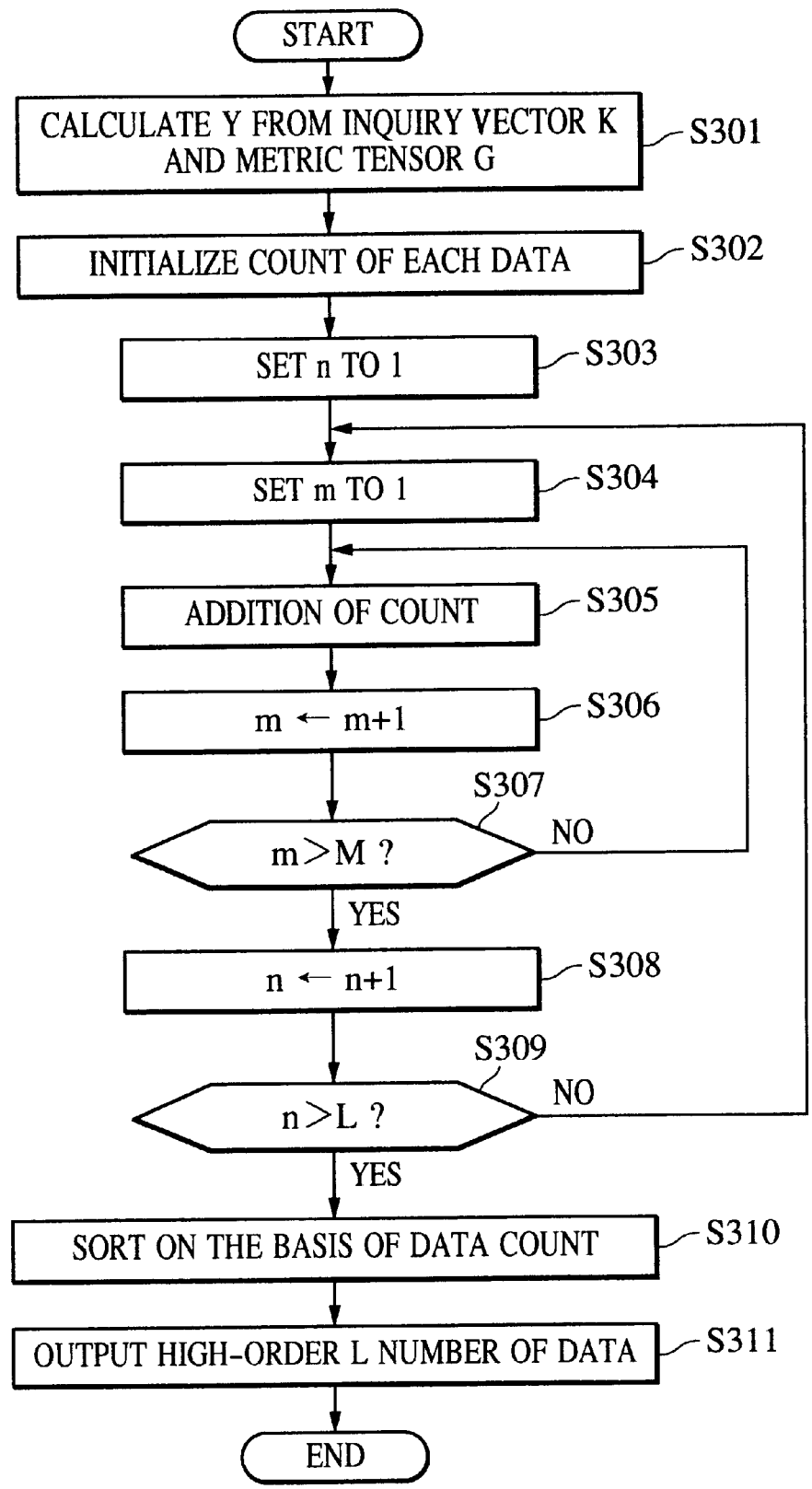
FIG. 3 is a flowchart showing the procedure of a candidate output section.

FIG. 3 is a flowchart showing the procedure of the candidate output section. Referring to FIG. 3, the processing of the candidate output section 102 is described below.

In step S301, a first-order covariant tensor $Y=K^T G$ is generated by causing the metric tensor G to act on the inquiry vector K.

In step S302, the count $P_n$ (n=1, 2, ..., N) of each data is initialized to 0. In step S303, the data number n is set to 1. In step S304, the component number m is set to 1.

In step S305, if the ID of the data positioned at the n-th place of the list for the m-th component is s, $Y^m \cdot (L-n)$ is added to $P_s$ with respect to the number L of data elements to be extracted. Here, $Y^m$ is the m-th component of the first-order covariant tensor Y. In addition to this, the score to be added may be $Y^m \cdot (N-n)$ by using the total number N of data elements or may be $Y^m \cdot X_m$ by using the m-th component $X_m$ of the data.

In step S306, the component number m is updated to m+1. In step S307, a check is made to determine whether or not the component number m exceeds the dimension M of the vector. If the component number m exceeds the dimension M, the process proceeds to step S308, and if not, the processing from steps S305 to S307 is repeated.

In step S308, the data number n is updated to n+1. In step S309, a check is made to determine whether or not the data number n exceeds the number L of data elements to be extracted. If the number n of data elements exceeds the number L, the process proceeds to step S310, and if not, the processing from steps S304 to S309 is repeated.

In step S310, a sorting list in a descending order is created on the basis of the count P of the data elements. Here, since the number of data elements, the count of which is not 0, is from L to ML, the number of comparisons when the sorting list is created is from O (L logL) to O (ML logML). The computational complexity for adding the count is ML number of multiplications and additions.

In this regard, in order to calculate the inner product of all the data which appear up to the L-th column of the sorting list and the inquiry vector K, ML to $M^2L$ number of multiplications and additions are required.

Next, the above-mentioned procedure is described by using a specific example. Here, it is set that the inquiry vector K specified by the user=$(0.7836, 0.2662, 0.2658, 0.1009, 0.4840)^T$ and L=3. It is also assumed that the metric tensor G is given as shown below:

$$G = \begin{pmatrix} 1.0000 & 0.8205 & 0.4236 & 0.7646 & 0.7299 \\ 0.8205 & 1.0000 & 0.5336 & 0.6867 & 0.7790 \\ 0.4236 & 0.5336 & 1.0000 & 0.7450 & 0.4692 \\ 0.7646 & 0.6867 & 0.7450 & 1.0000 & 0.8609 \\ 0.7299 & 0.7790 & 0.4692 & 0.8609 & 1.0000 \end{pmatrix}$$

Further, data for objects of comparison are the following ten data.

X1=$(0.3196, 0.5937, 0.5683, 0.1143, 0.4574)^T$
X2=$(0.3589, 0.5454, 0.2738, 0.4541, 0.5409)^T$
X3=$(0.4822, 0.5395, 0.4760, 0.4997, 0.0129)^T$
X4=$(0.6625, 0.3926, 0.3464, 0.0487, 0.5335)^T$
X5=$(0.3432, 0.4686, 0.4787, 0.1401, 0.6433)^T$
X6=$(0.6033, 0.6201, 0.3790, 0.0970, 0.3138)^T$
X7=$(0.7849, 0.1710, 0.3539, 0.2505, 0.4083)^T$
X8=$(0.6276, 0.3131, 0.3328, 0.5743, 0.2600)^T$
X9=$(0.1558, 0.7358, 0.1131, 0.4643, 0.4539)^T$
X10=$(0.0005, 0.0008, 0.6976, 0.6561, 0.2879)^T$

Initially, the list creation section 101 creates the following five sorting lists as descending-order lists regarding the intensity for each component of the above ten five-dimensional (vertical) vectors of the above, and stores them:

First component→{X7, X4, X8, X6, X3, X2, X5, X1, X9, X10}
Second component→{X9, X6, X1, X2, X3, X5, X4, X8, X7, X10}
Third component→{X10, X1, X5, X3, X6, X7, X4, X8, X2, X9}
Fourth component→{X10, X8, X3, X9, X2, X7, X5, X1, X6, X4}
Fifth component→{X5, X2, X4, X1, X9, X7, X6, X10, X8, X3}

Since the number of calculations of the descending order lists is O (N logN) with respect to the number N of data elements, if the vector has M dimensions, preparatory operations of O (MN logN) may be made in advance.

In the candidate output section 102, first, the first order covariant tensor Y is obtained on the basis of the metric tensor G and the inquiry vector K:

$Y=K^T G=(1.5450, 1.4973, 1.0420, 1.4976, 1.4749)$

Next, the count of data elements which appear up to the third column of the sorting list for each component is added. When sorting is performed according to the count, the high-order three becomes {X5, X2, X1}. When a comparison is made with the high-order three of {X2, X8, X5, X6, X4, X9, X1, X3, X7, X10}, which is the result of the accurate calculations of the inner product, two out of the results of the high-speed approximation calculation are correct. For the above processing, ML number of multiplications and additions should suffice.

In comparison, when conventional inner-product calculations are performed, MN number of multiplications and additions are required to calculate the respective inner products. Therefore, when L is much smaller than N, this is effective technology in terms of computational complexity. The situation where a huge valve of N is handled is encountered in an ordinary recognition problem. In many cases, if several data close to the basic data K at most is obtained, this is sufficiently effective for the subsequent processing.

The above-described processing is summarized as described below.

In advance, a list is created and stored in which data belonging to a data set, in which each data is represented by a vector using amounts of appropriate features, is arranged in descending order for each component of the vector. Then, the inquiry vector K represented by the same feature-amount space, the metric tensor G, and the required number L of output data are input. Next, a score is given to the high-order L count of each list on the basis of the component value of the inquiry vector K and the metric tensor G, and the data ID of the high-order L count of the score are output.

According to the embodiment described above, a part of sorting lists of a vector data set based on the similarity with the given vector can be created at a high speed. This makes it possible to markedly shorten the retrieval speed when a vector similar to the inquiry vector is retrieved from the database.

The present invention, in a range in which the functions of the above-described embodiment can be realized, may be applied to a system comprising a plurality of apparatuses (for example, a computer main unit, an interface apparatus, a display device, and so on), or may be applied to an apparatus formed of a single unit.

The following is also included in the range of the present invention: for the purpose of operating various devices so as to realize the functions of the above-described embodiment, program codes of software that realizes the functions of the above-described embodiment are supplied to a computer within an apparatus connected to various devices or a system, and the various devices are operated by the computer (or a CPU or MPU) of that system or apparatus according to the supplied program. In this case, the program codes themselves read from a storage medium realize the functions of the above-described embodiment, and the program codes themselves and means for supplying the program codes to the computer, for example, a storage medium for storing such program codes, constitute the present invention.

As a storage medium for supplying such program codes, for example, a floppy disk, a hard disk, an optical disk, an optomagnetic disk, a CD-ROM, a CD-R, a magnetic tape, a non-volatile memory card, a ROM, and so on can be used.

Further, in addition to the case where the functions of the above-described embodiment are realized by the execution of read program codes by a computer, when the functions of the above-described embodiment are realized in cooperation with an OS (operating system) operating on a computer or another application software according to the instructions of the program codes, it is a matter of course that such program codes are included within the range of the present invention.

Furthermore, it is a matter of course that the following case is included within the range of the present invention: after program codes read from a storage medium are written into a memory provided in a function expansion board inserted into a computer or a function expansion unit connected to a computer, a CPU or the like provided in that function expansion board or that function expansion unit performs a part or the entirety of actual processing according to the instructions of the program codes, and the functions of the above-described embodiment are realized by that processing.

When the present invention is applied to the storage medium, the program codes corresponding to the flowchart described earlier may be stored in that storage medium.

Although the present invention has been described in its preferred form with a certain degree of particularity, many apparently widely different embodiments of the invention can be made without departing from the spirit and the scope thereof. It is to be understood that the invention is not limited to the specific embodiments thereof except as defined in the appended claims.

What is claimed is:

1. A data processing apparatus for extracting a predetermined number of data elements having a high similarity based on an inner product with an inquiry vector from a set of data in a vector form, said data processing apparatus comprising:

a database storing a set of data in a vector form;

list creation means for creating a list of data such that the data of the database is arranged in a descending order of the intensity of each one component of a vector, respectively;

input means for inputting an inquiry vector;

score calculation means for adding with respect to each data, for each of the components, a score based on a numerical value given in a descending order to the place of the list for the respective component, and the component of said inquiry vector corresponding to the component of the data with regard to said inner product, and calculating a total score with respect to each data by adding up the scores for all the components; and output means for outputting said predetermined number of data elements on the basis of said total score of each data.

2. A data processing apparatus according to claim 1, wherein said inner product is defined by a predetermined tensor, and said score calculation means calculates the score with respect to each data, for each of the components, based on said numerical value, and said component of said inquiry vector and the component of said predetermined tensor corresponding to said component of said data with regard to said inner product.

3. A data processing apparatus according to claim 1, wherein the score calculation means adds a score regarding each of said component with respect to a second limited predetermined number of high-order data elements in the list for the components.

4. A data processing apparatus according to claim 1, wherein said second predetermined number is equal to said predetermined number.

5. A data processing apparatus according to claim 1, wherein the numerical value given in a descending order to the place of a list for each of said components is a value such that said place is subtracted from the total number of data elements or from said predetermined number.

6. A data processing apparatus according to claim 1, wherein the numerical value given in a descending order to the place of a list for each of said components is a value of said component of each data.

7. A data processing method for extracting a predetermined number of data elements having a high similarity based on an inner product with an inquiry vector from a set of data in a vector form stored in a database, said data processing method comprising:

a list creation step of creating, for each component, a list of data in which data of said database is arranged in a descending order of the intensity of one component of a vector;

an input step of inputting an inquiry vector;

a score calculation step of calculating with respect to each data, for each of the components, a score based on a numerical value given in a descending order to the place of a list for the respective component, and the component of said inquiry vector corresponding to the component of the data with regard to said inner product, and calculating a total score with respect to each data by adding up the scores for all of the components; and an output step of outputting said predetermined number of data elements on the basis of said total score of each data.

8. A data processing method according to claim 7, wherein said inner product is defined by a predetermined tensor, and in said score calculation step, a score is calculated for each of the components based on said numerical value, and said component of said inquiry vector and the component of said predetermined tensor corresponding to said component of said data with regard to said inner product.

9. A data processing method according to claim 7, wherein, in said score calculation step, a score for each of said components is added with respect to a second limited predetermined number of high-order data in the list for the component.

10. A data processing method according to claim 7, wherein said second predetermined number is equal to said predetermined number.

11. A data processing method according to claim 7, wherein the numerical value given in a descending order to the place of a list for each of said components is a value such that said place is subtracted from the total number of data elements or from said predetermined number.

12. A data processing method according to claim 7, wherein the numerical value given in a descending order to the place of a list for each of said components is a value of said component of each data.

13. A computer-readable storage medium storing a data processing program for controlling a computer to extract a predetermined number of data elements having a high similarity based on an inner product with an inquiry vector from a set of data in a vector form stored in a database, said program comprising codes for causing the computer to perform:

a list creation step of creating, for each component, a list of data in which data of said database is arranged in a descending order of the intensity of one component of a vector;

an input step of inputting an inquiry vector;

a score calculation step of calculating with respect to each data, for each of the components, a score based on the numerical value given in a descending order to the place of a list for the respective component, and the component of said inquiry vector corresponding to the component of the data with regard to said inquiry vector, and calculating a total score with respect to each data by adding up the scores for all the components; and an output step of outputting said predetermined number of data elements on the basis of said total score of each data.

* * * * *